United States Patent

[11] 3,595,990

[72] Inventor Clayton A. Washburn
24 Andrea Lane, Thornwood, N.Y. 10594

[21] Appl. No. 737,020
[22] Filed June 14, 1968
[45] Patented July 27, 1971

[54] COLOR CAMERA
27 Claims, 15 Drawing Figs.

[52] U.S. Cl. .......... 178/5.4
[51] Int. Cl. .......... H04n 9/22
[50] Field of Search .......... 178/5.2 A, 5.4 STC, 5.4 TCC, 5.2; 250/226, 213

[56] References Cited

UNITED STATES PATENTS

| | | | |
|---|---|---|---|
| 2,696,520 | 12/1954 | Bradley | 178/5.4 STC |
| 2,738,379 | 3/1956 | James et al. | 178/5.4 STC |
| 2,820,167 | 1/1958 | Schroeder | 178/5.4 STC |
| 3,288,921 | 11/1966 | James et al. | 178/5.4 TCC |
| 3,463,880 | 8/1969 | Corson | 178/7.2 |
| 3,471,634 | 10/1969 | Clark et al. | 178/5.2 |

*Primary Examiner*—Richard Murray
*Assistant Examiner*—Alfred H. Eddleman

*Attorneys*—Robert S. Dunham, P. E. Henninger, Lester W Clark, Thomas F. Moran, Gerald W. Griffin, Howard J. Churchill, R. Bradlee Boal, Christopher C. Dunham and Robert Scobey

ABSTRACT: A color camera including a first image pickup cathode-ray tube for developing a signal representative of the brightness or luminance content of an image, and a second such cathode-ray tube generating a signal representative of chrominance content of the image. Scanning of the two cathode-ray tubes is synchronized and registered with respect to boundary regions in the target of one of the tubes. The boundary regions may be provided through the use of adjacent strips of illuminated and nonilluminated areas of the target. The two tubes typically focus on a scene through lens systems mechanically and/or optically coupled together. A scanning adjustment is made in accordance with view angle shift between the cathode-ray tubes in order to correct for distortion. The cathode-ray tube for generating chrominance signal components may employ a cylindrical lens structure on its faceplate in conjunction with dichroic mirror or other color separation elements to divide all portions of the image into at least two of the three primary colors red, green and blue through all areas of the cathode-ray tube target. Scanning in this cathode-ray tube is by steplike motion with the beam dwelling in each color area as it scans across the tube target.

INVENTOR.
CLAYTON A. WASHBURN
BY
Robert Scobey
ATTORNEY

COLOR CAMERA

BACKGROUND OF THE INVENTION

This invention relates to a color camera, that is, an optical image-sensing device which scans an image in a predetermined manner and provides an output (video) signal having components representative of the chrominance (primary colors or hue and saturation) as well as the luminance or brightness content of the image. Accordingly, the camera may comprise a unit for live pickup of studio or outdoor scenes, for example, or it may provide pickup from a color slide, film or other storage device involving recorded color information.

The color camera of the present invention provides a first signal component containing the luminance or brightness intensity variations of a scene in fine detail and a second signal component containing, with less detail, pulses representing the amplitude of the primary color components of the scene. It is known that a human perceives fine detail according to the monochrome intensity variations of light but is considerably less perceptive to the detail of color variations. The present invention takes advantage of this response of the human to light.

There has been developed a wide variety of color-signal-processing (encoding and decoding) methods, most associated with the NTSC form of composite color signal. The output signal from the color camera of the present invention is such that it is adaptable to any of these present forms of signal processing. The output signal of the color camera of the present invention is such that it may also be used in a more direct manner in special circumstances; for example, involving closed-loop pickup and display applications.

In the prior art the most commonly used arrangement for a color camera involves three separate pickup devices. The primary colors of an image are separated optically by means of dichroic mirrors (color-selective filters) and are applied each to a separate pickup device. Each pickup device may be an image orthicon; at the present time devices of the vidicon type employing photoconductive target surfaces are often preferred. A separate color signal is provided by each device, and the signals may be processed in various ways ultimately for displaying color information on a single display device. In such a separate pickup tube arrangement, to preserve the luminance intensity detail or resolution of the original scene, which is provided by adding together the primary color signal components, it is essential that registration of the scanning of the three separate images by the three separate pickup tubes be accurately accomplished. To alleviate this problem some cameras have been made employing one pickup tube for generating a detailed luminance intensity signal and three more tubes for generating the color signal components.

In the present invention a single essentially standard pickup tube is employed to provide a detailed luminance or brightness intensity signal. A second tube is used to generate a chrominance or color signal. Although, as in the above multitube arrangements, registration of scanning between the two tubes is necessary, the registration between color and luminance images is considerably less critical than in those systems employing more than one tube for the development of a chrominance signal. The two-tube arrangement of the present invention may be employed with separate optical paths of lens elements to provide increased light pickup. Alternatively, beam splitting may be employed with a single lens system focusing on a scene to provide the two images necessary for the development of the chrominance and luminance signals.

When separate optical imaging means are employed with each tube, the present invention contemplates a mechanical coupling arrangement which simultaneously adjusts focus and provides either relative translation or tilt of the cameras in order that they each pick up the identical scene. When camera tilt is employed, means are provided for compensating for the trapezoidal distortion thereby introduced. Further, in the present invention there is provided registration of the scanning within the tubes with respect to a boundary region in one of the tubes. This tube may be either the luminance or chrominance signal-generating tube. Still further, a unique lens and dichroic element arrangement is employed in connection with the chrominance signal-generating tube to provide a breaking down of the image throughout the entire target surface of the tube into striped areas of primary colors. During scan the beam is stepped progressively from one color strip to the next to achieve optimum signal output.

BRIEF DESCRIPTION OF THE DRAWINGS

The invention will be more completely understood by reference to the following drawings, in which.

DETAILED DESCRIPTION

Figure 1:
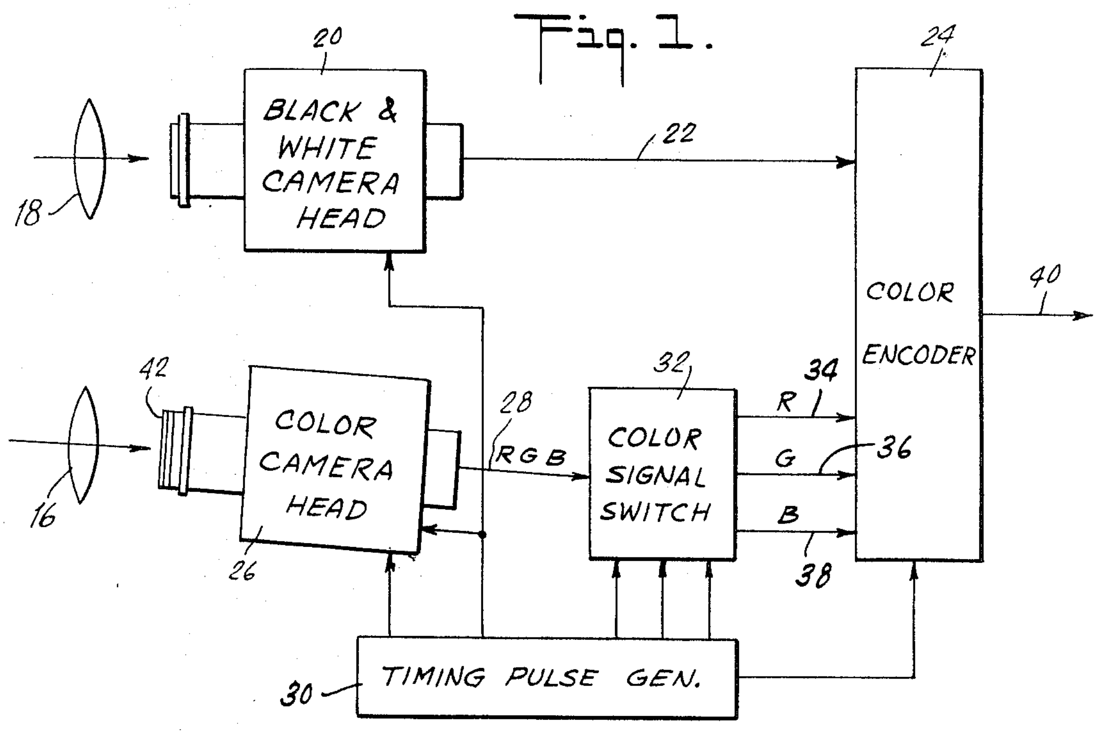
FIG. 1 is a block diagram of a color camera in accordance with the invention.

Referring to FIG. 1, a black and white camera head 20 is shown viewing a scene through a main image-forming lens 18. The camera head 20 typically comprises a cathode-ray tube of the vidicon type, which develops at an output 22 a luminance signal (black and white signal) representative of the luminance intensity detail of the scene. The signal is applied to a color encoder 24. A color camera head 26, typically of the vidicon type, also focuses on the scene through a main image-forming lens 16 and generates at an output 28 a chrominance signal, e.g., a signal containing information regarding the primary colors (red, green and blue) of the scene viewed by the camera head. The black and white and color camera heads 20 and 26 are under the control of a timing pulse generator 30, which also supplies timing signals to a color signal switch 32. The color signal switch provides signals on outputs 34, 36 and 38 representative of the primary colors red, green and blue of the scene. These chrominance signals are applied to the color encoder 24 which generates at an output 40 a composite signal containing luminance (black and white) as well as chrominance (color) information. The signal at the output 40 may be of the NTSC form of composite color signal adaptable to any of the presently used forms of signal manipulation for subsequent reproduction in a color reproducer such as a standard color television receiver.

Alternatively, the color encoder 24 and color signal switch 32 may be dispensed with and replaced by a filter at the color set frequency to provide a composite signal which may be added directly to the luminance (black and white) signal at the output 22 to form an equivalent but nonstandard form of NTSC signal for subsequent reproduction of the scene. Still further, the signals could be used separately, without being added together, in closed-loop systems for the separate control of reproduction units. As another alternative, the color camera head 26 may generate a chrominance signal containing information regarding only two of the three primary colors (e.g., red and blue) of the scene viewed by the camera head. In such a case, the luminance or brightness signal developed by the black and white camera head 20 may be filtered and added to appropriate portions of the signal components representing these two primary colors (red and blue) to obtain a signal representative of the remaining primary color (green) of the scene.

Figure 2:
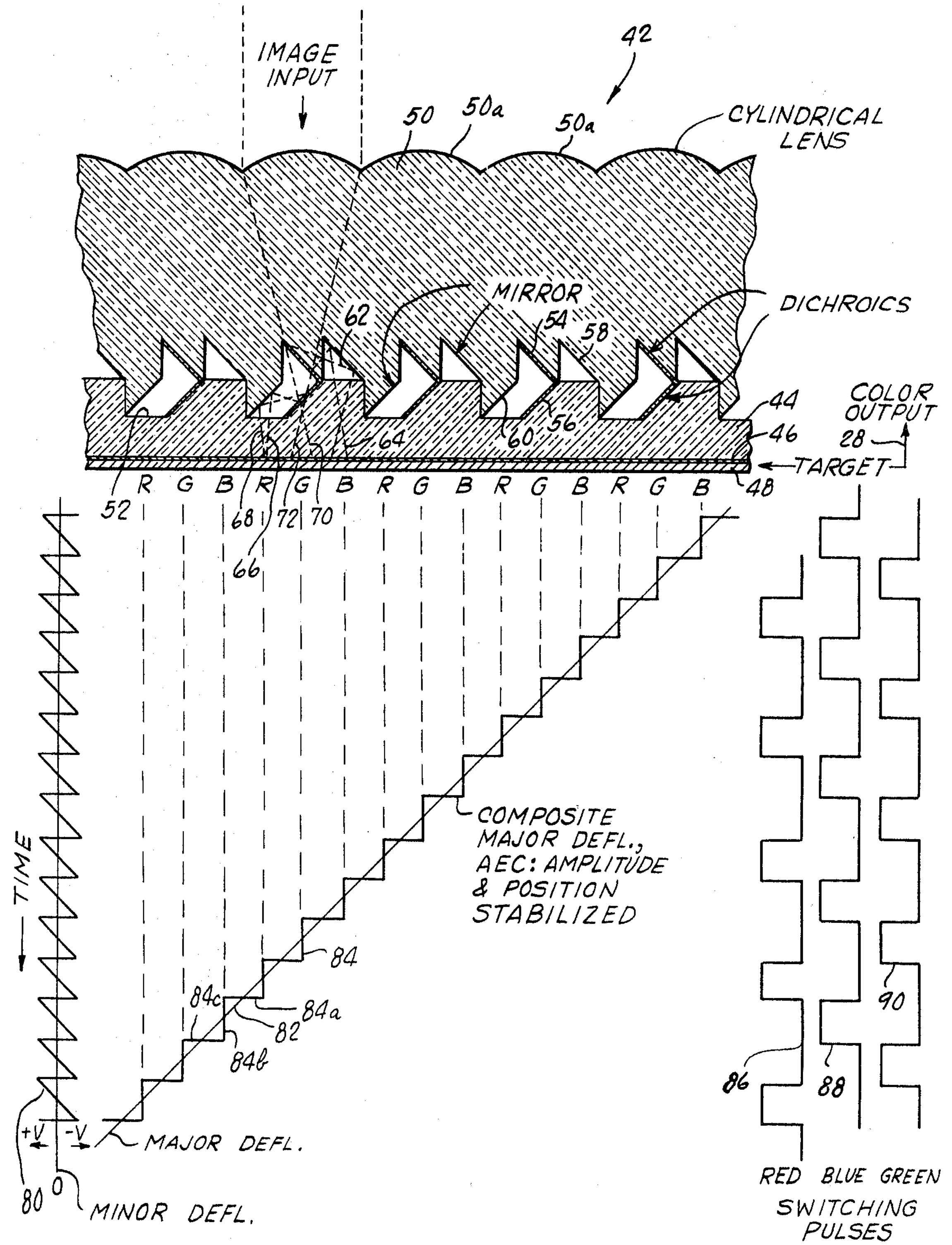
FIG. 2 is a sectional view of a portion of one of the pickup tubes of a color camera illustrating a lens and dichroic element arrangement in accordance with the invention, along with waveform diagrams of various signals used in the system of FIG. 3.

The black and white camera head 20, in one embodiment as noted above, comprises a standard cathode-ray tube of the vidicon type presently in use to develop a luminance (black and white) signal. The color camera head 26 may also be a cathode-ray tube of the vidicon type the same as the tube employed for the black and white camera head 20. It is contemplated, however, that a lens and dichroic element arrangement 42 in connection with the faceplate of the color cathode-ray tube will be utilized to provide a color camera in accordance with the present invention. FIG. 2 shows the details of the lens and dichroic element arrangement 42.

Figure 5:
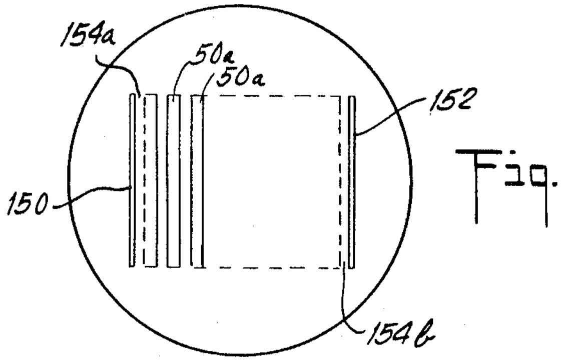
FIG. 5 is a front view of the face of one of the pickup devices of FIG. 3 showing lens elements and also boundary regions useful for scanning registration.

Referring to FIG. 2, the faceplate 44 of the cathode-ray forming the color camera head 26 is shown as backed by a transparent conductive film 46 and a photo sensitive conductive target layer 48. This is the standard faceplate construction of cathode-ray tubes of the vidicon type. Positioned in front of the faceplate 44 is a cylindrical lens arrangement 50. The lens 50 is formed with cylindrical front sections or strips **50*a*, each of which concentrates the rays of light which it intercepts toward a region of the target 48. The cylindrical lenses 50*a* are across the entire target surface, as shown in FIG. 5, to a greatly enlarged scale. Typically, for color television applications, there may be the order of 60 to 200 of such cylindrical lens strips across the surface of a vidicon tube faceplate 44 that is 1 inch in diameter. A main lens system (not shown in FIG. 2) forms an image of the scene near but beneath the surface of the cylindrical lens arrangement 50, and the portions of this image are directed by the individual lens elements 50*a* to associated areas of the target 48**.

In FIG. 2 the face plate 44 of the cathode-ray tube is shown etched or cut away as at 52. This is for the purpose of positioning dichroic and mirror elements at the interface of the cylindrical lens arrangement 50 and the faceplate 44, as will now be described. In particular, in connection with each cylindrical lens strip **50*a*, there are associated therewith dichroic elements 54 and 56 as well as mirror elements 58 and 60. The dichroic and mirror elements associated with each cylindrical lens strip 50*a* serve to separate the primary color components of the portion of the image focused by the cylindrical lens strip. In particular, the rays of light intercepted by one of the cylindrical lens strips 50*a* first are focused onto dichroic element 54 which acts in its normal fashion to reflect all wavelengths of light above or below a certain value and to transmit the remainder. Dichroic element 54, for example, is selected to reflect the primary blue component of light onto the reflective mirror surface 58 and thence onto the target surface 48 as at the region of the surface designated B for blue. Dashed lines 62 and 64 in FIG. 2 show the reflections of two different rays of blue light from the dichroic and mirror elements 54 and 58 onto the target surface 48. In this example, the green and red primary components of light are transmitted through the dichroic element 54 onto dichroic element 56. Dichroic element 56 may be selected to reflect the red primary component onto reflective mirror 60. The red component is reflected from the mirror to the target surface 48 in the region designated R for red. Rays of light 66 and 68 in FIG. 2 show reflection of the red primary component onto the target surface. Finally, the green component of light that is transmitted directly through the dichroic element 54 may be transmitted directly through the dichroic element 56 onto the target surface in the region designated G for green. Rays of light 70 and 72 in FIG. 2 show the transmission of the green component through the dichroic elements 54 and 56** onto the target surface.

The cylindrical lens strips and dichroic and mirror elements accordingly separate the image into tricolor sets of stripes of light across the target surface. In the arrangement shown in FIG. 2 the face plate 44 of the cathode-ray tube is etched or cut away as described above, to accommodate the mirror and dichroic elements. These mirror and dichroic elements may be deposited as thin films of material It is possible, however, to incorporate the mirror and dichroic elements in the lens material 50 and leave the cathode-ray tube faceplate 44 unchanged. In such case the cylindrical lens, mirror and dichroic elements are positioned as a unit on the faceplate. The dichroic and other mirror elements may also be positioned at an intermediate image plane (not shown) of the optical imaging system as will occur in some applications, for example, in film pickup systems. In some cases where illumination is adequate the cylindrical lens elements **50*a* are not essential. Any arrangement will suffice so long as the image is broken up into a series of stripes of primary colors at the target surface 48**.

The electron beam in the cathode-ray tube is caused to scan across the target surface 48 (right to left in FIG. 2) passing each of the stripes of light representing the primary colors. It is contemplated in the present invention that the beam will dwell in the region of each stripe of light and then pass rather quickly to the next region. For example, the beam will dwell in a region to which red primary light is directed by the mirror and dichroic elements and then will step next to the adjacent region to which blue light is directed by the dichroic elements. The beam will dwell in this region and will then pass rapidly to the adjacent region to which green light is directed, where it will dwell and then step rapidly to the adjacent region to which red light is directed, and so on across the surface of the target. The beam typically moves across the target in a series of line scans, one adjacent the other, to complete a raster scansion of the complete target in typical television scanning fashion.

FIG. 2 shows the waveform diagrams of minor and major deflection signals which may be applied to major and minor deflecting elements (described later in connection with FIG. 3) in the cathode-ray tube to cause the scanning of the beam across the surface of the target as described above, to achieve the steplike scanning of the target surface with dwelling in the regions to which the primary colors are directed. In particular, waveform diagram 80 represents the minor deflection sawtooth signal that is applied to the minor deflection element. The minor deflection signal may vary with time between +V and −V volts, as shown in FIG. 2. A major deflection signal designated 82 in FIG. 2 may be applied to the major deflection element of the cathode-ray tube. The major deflection signal, by itself, would cause a movement of the electron beam of the cathode-ray tube at a uniform velocity across the surface of the target. However, the minor deflection signal counteracts the major deflection signal so that, as the minor deflection signal is varying from +V to −V, the effect of the major deflection signal is nullified and the normal movement of the beam is counteracted so that the beam remains essentially stationary during this time.

The movement of the beam is represented in FIG. 2 with respect to time by the curve designated 84 and termed the composite major deflection of the beam. For example, during one of the cycles of the minor deflection signal in which that signal is changing from −V to +V, the beam is moved rapidly from a region of the target surface 48 bathed in red light to a region bathed in blue light; this movement of the beam is designated by the segment **84*a* of the curve 84. During the time that the minor deflection signal is changing from +V to −V, counteracting the major deflection signal, the beam remains in the region of the target surface bathed in blue light, as represented by the segment designated 84***b* of the curve 84. As the minor deflection signal next goes from −V to +V, the beam rapidly steps from the region of the target surface bathed in blue light to a region bathed in green light; this movement is represented by the segment designated 84*c* of the curve 84. It will be noted, therefore, that the beam is made to step from one region of the target surface representing one primary color to another region representing another primary color. If the distance between the primary colors is somewhat larger than the beam width, the scanning beam can move somewhat within these regions (as a result of scanning distortions or errors, for example), and still the beam will be properly registered with respect to the primary colors. The beam, however, is registered with respect to boundary regions to assure accurate scanning of the color stripes, as will be explained in more detail later. With such beam movement a constant frequency chrominance signal will be developed when the timing pulse generator 30 operates at a constant frequency.

In FIG. 2 switching pulses illustrated by the waveforms designated 86, 88 and 90 are employed to separate from the signal developed by the target (at output 28) the individual primary color signals. Specifically, the waveform diagrams 86, 88 and 90 have been positioned in FIG. 2 in a proper orientation with respect to the waveforms 80 and 84. It will be noted that a red switching pulse 86 occurs every time that the beam is positioned in a region bathed by red light. A switching pulse 88 is developed every time that the beam is positioned in a region bathed by blue light, and a switching pulse 90 is developed every time that the beam is positioned in a region bathed by green light. The switching pulses are employed in a system as shown in FIG. 1 to control a color signal switch, such as the switch 32, to develop separate signals representing the red, green and blue primary colors.

Figure 3:
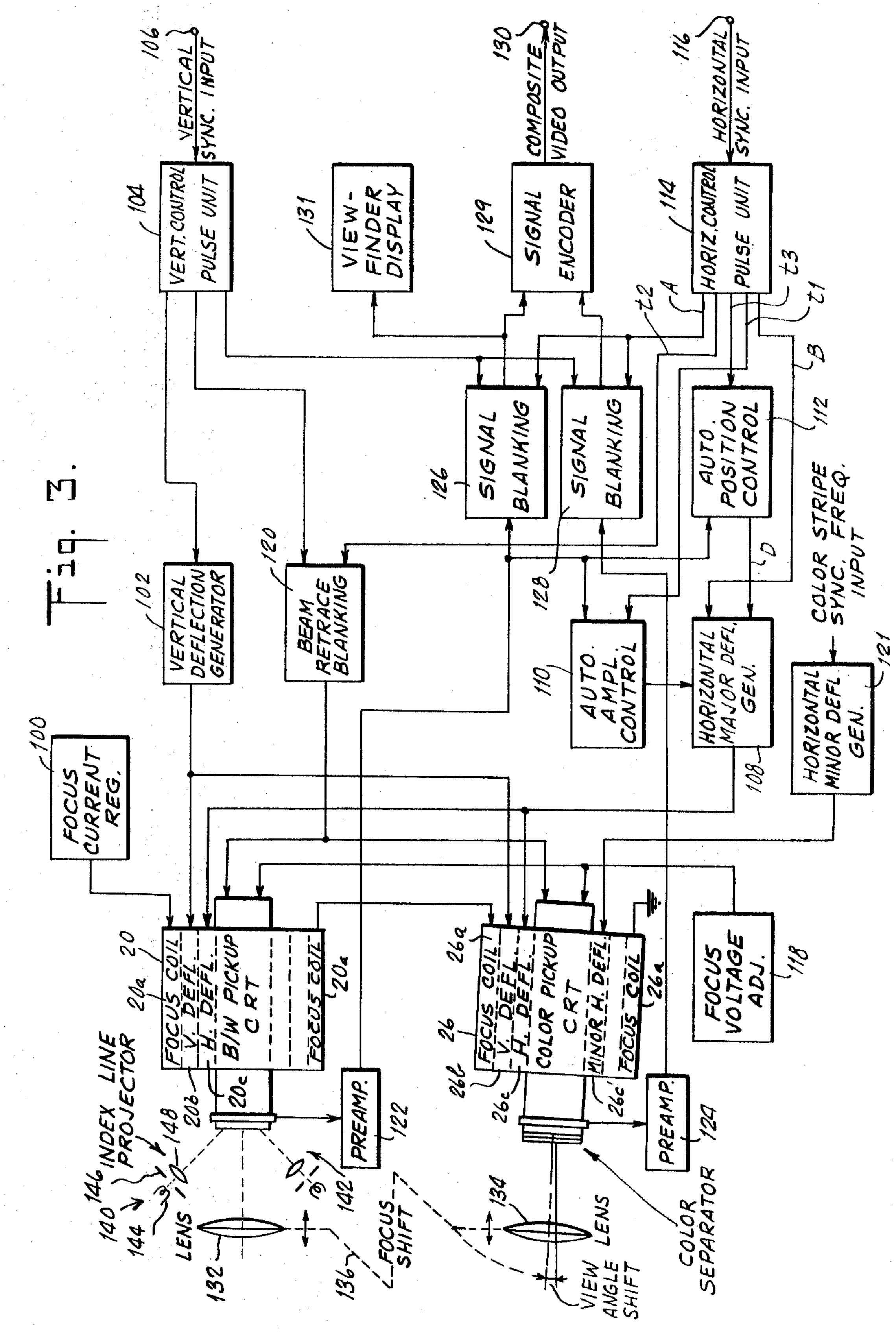
FIG. 3 is a block diagram similar to that of FIG. 1 showing in more detail an embodiment of the invention.

Referring now to FIG. 3, there is shown in detail a system in accordance with FIG. 1. The same reference numerals have been used in FIG. 3 to designate like components of FIG. 1. The black and white camera head 20 is shown as including a focus coil 20*a* which is energized by a focus current regulator 100. The current from the focus current regulator, to provide identical focusing of both camera beams, passes through the focus coil 20*a* and thence in series through focus coil 26*a* of color camera head 26. The two camera heads or cathode-ray tubes 20 and 26 include vertical deflection coils 20*b* and 26*b*, respectively, which are shown energized by a vertical deflection generator 102 under the control of a vertical control pulse unit 104. The pulse unit 104 is triggered by a vertical sync input signal applied to input 106. It will be apparent then that vertical deflection in the two cathode-ray tubes is rendered in synchronism by virtue of the common energization of the deflection yokes by vertical deflection generator 102. The two cathode-ray tubes also include horizontal deflection coils 20*c* and 26*c*, respectively. The horizontal deflection coils are energized by a horizontal major deflection generator 108, which generates the major deflection signal 82 shown in FIG. 2. This deflection generator is under the control of an automatic amplitude control circuit 110 and an automatic position control circuit 112. The horizontal major deflection generator 108 is triggered by a pulse signal B developed by horizontal control pulse unit 114 receiving horizontal sync. input signals at input 116.

The two cathode-ray tubes also have signals applied thereto by a focus voltage adjustment circuit 118 which provides common focus voltage adjustment. Common beam retrace blanking is provided for both cathode-ray tubes by a beam retrace blanking circuit 120 under the control of signals from the vertical control pulse unit 104 as well as from the horizontal control pulse unit 114. A horizontal minor deflection generator 121 generates a minor deflection signal (the minor deflection signal 80 shown in FIG. 2) which is applied to minor horizontal deflection coil 26*c'* of color pickup cathode-ray tube 26 to provide for the minor deflection of the beam which, in conjunction with the major deflection, causes the dwelling of the beam on the color regions of the target of the cathode-ray tube, as explained above in connection with FIG. 2. In this regard it should be noted that for the purpose of this embodiment it is assumed that the electron beam in each of the cathode-ray tubes scans across the target of the tube in a series of horizontal line scans which are displaced vertically one over another. The scanning mode could just as well be vertical line scans displaced horizontally from each other or any other direction of line scan with successive scanning lines displaced to provide a raster scansion across the surface of the target.

As the scanning beam in each cathode-ray tube scans across the target surface and impinges upon areas bathed or not bathed in light, as the case may be, a signal is developed at the target which is amplified by a preamplifier (preamplifier 122 in connection with the black and white camera head 20 and preamplifier 124 in connection with the color camera head 26). The preamplifier 122 is coupled to a signal-blanking circuit 126 as well as to the automatic amplitude control circuit 110 and the automatic position control circuit 112. The preamplifier 124 applies signals to signal-blanking circuit 128. The signal-blanking circuits 126 and 128 are controlled by signals from the vertical control pulse unit 104 and the horizontal control pulse unit 114. The blanking of the preamplifier signals is during the period of retrace and beam registration, as will be explained in more detail later. In any event, the signals from the signal-blanking circuits 126 and 128 are applied to signal encoder 129 to generate a composite video output signal at output 130. The encoder 129, as shown, would comprise an approximate 1.5-megacycle band-pass filter centered to pass the color set frequency of the color signal from preamplifier 124 before adding it to the luminance signal from the preamplifier 122. If separation of individual color components were desired, it would provide color switching pulses synchronized from the color stripe sync frequency input as described in FIGS. 1 and 2. The signal from the blanking circuit 126 is also applied to a viewfinder display 131, typically a cathode-ray tube which reproduces a black and white image of the scene viewed by the camera heads to aid in locating and focusing the camera heads on the scene desired.

The two cathode-ray tubes 20 and 26 are adapted to have images of a scene focused on the targets thereof. In applications where there is abundant light available, two images of the scene may be obtained from a single lens (not shown) employing a beam splitter (not shown) such as a half silvered mirror or the like. Where light sensitivity is important, however, separate lenses 132 and 134, as shown in FIG. 3, may be employed. In this arrangement, both the black and white camera head and the color camera head may pivot so as to focus on any scene in any direction. Typically, the black and white camera head focuses on a scene, and the color camera head is coupled to the focusing mechanism by a mechanical coupling arrangement designated 136 so that, as the lenses 132 and 134 are focused, the color camera head pivots by an amount designated in FIG. 2 as a view angle shift so that both cameras point to the same position in the plane to which they are focused. In other words, the two lens systems are coupled together so that, as one is focused, the other undergoes similar focusing and a view angle shift so that both camera heads register and focus on the same scene. Registration on the same scene may also be accomplished by lateral translation of one or both lenses with respect to the camera tubes or vice versa. When rotation of one camera head with respect to the other is employed, the view angle shift creates trapezoidal distortion in some cases, which is overcome by circuitry, as explained in connection with FIGS. 6 and 7.

The black and white and color camera heads 20 and 26 undergo synchronized scanning by virtue of the common energization of their deflection control circuits. In conjunction with the black and white camera head 20, by way of illustration, there is employed a scanning registration control arrangement similar to the scanning control arrangements disclosed in my copending applications Ser. No. 592,625, filed Nov. 7, 1966, for Error Correction System for Cathode-Ray Tube Information Display, now U.S. Pat. No. 3,497,758 and Ser. No. 711,999, filed Mar. 11, 1968, for Cathode-Ray Tube Apparatus now U.S. Pat. No. 3,497,761. In conjunction with the scanning and registration circuits, the operation of which will now be explained, index line projectors 140 and 142 in FIG. 3 are employed. The projector 140 involves a light source 144, a mask 146, and a lens 148 to project a strip of light 150 onto the face of the cathode-ray tube, as shown in FIG. 5. The index line projector 142 involves a similar light source, mask and lens to project a strip of light 152 on the other side of the face of the cathode-ray tube, as shown in FIG. 5. The face of the cathode-ray tube may be conveniently masked so that dark or nonilluminated areas **154*a* and 154*b* are positioned on either side of the format between the edges of the image area, corresponding to lens strips 50*a* and the reference strips of light 150 and 152**. In other words, the index line projectors in connection with appropriate masking of the face of the cathode-ray tube (if necessary) provide for boundary regions on the two sides of the cathode- ray tube face comprised of adjacent illuminated and nonilluminated areas. These adjacent illuminated and nonilluminated areas result in different signals being generated by the target of the tube as the beam passes from one area to another in the registration of the scanning beam, as will now be explained. The registration technique is similar to that disclosed in the copending applications just referred to.

Figure 4:
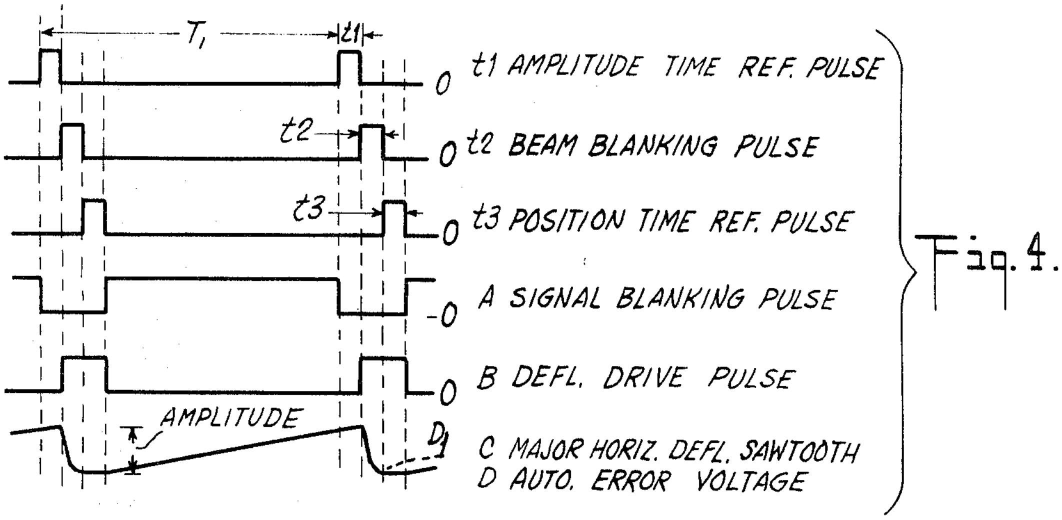
FIG. 4 is a series of waveform diagrams showing the timing of various signals in the system of FIG. 3.

Referring to FIG. 4, waveform C represents the major horizontal deflection sawtooth signal generated by deflection generator 108 of FIG. 3 (waveform C is the same as waveform 82 of FIG. 2, to a different scale). This signal causes line scan deflection of the beam. The pulse waveform *t3* represents a pulse signal generated by the horizontal control pulse unit 114 in FIG. 3 at a time just following beam retracement. In other words, the pulse signal *t3* occurs just after the beam in the cathode-ray tube has returned to its starting position following a line scan, ready to commence the next line scan. If the line scans in the cathode-ray tube are assumed to go relatively slowly from the region 150 in FIG. 5 toward the region 152 and then to return relatively rapidly from the region 152, the beam commences its line scan adjacent the region 150. The pulse signal *t3* generated by the horizontal control pulse unit 114 is applied to the automatic position control circuit 112, as shown in FIG. 3. During the time of pulse *t3*, the beam is assumed to be within the illuminated region 150, for example. Thus a discrete signal is generated by the preamplifier 122 which is applied to the automatic position control circuit 112. A first section (not specifically shown in FIG. 3) of the automatic position control circuit 112 comprises a pulse comparator or, in computer terminology, an AND gate, which provides a unit output signal only during a portion of the *t3* time interval when a signal from the preamplifier 122 is present. The automatic position control circuit 112 operates to integrate the signal from the AND gate and to generate an output signal which is applied to the horizontal major deflection generator 108. Thus during the time interval of pulse *t3* and as long as the scanning beam is within the illuminated area 150 shown in FIG. 5, a steadily increasing signal is generated by the automatic position control circuit 112. This steadily increasing signal (designated D in FIGS. 3 and 4), as applied to the horizontal major deflection generator is added to the sawtooth signal generated by that generator to produce a modified sawtooth signal at the output of the generator. The signal component D causes the scanning beam to move across the illuminated region 150 toward the adjacent nonilluminated region **154*a*. The beam is moved as long as the signal D increases until such time as it moves into the nonilluminated region 154*a*. At that time the signal from the preamplifier 122 drops to zero (or to some low value) resulting in the signal D remaining constant at its last value (due to the integrating action within the control circuit 112), and hence the beam is no longer moved away from the region 150. Accordingly, the beam remains just off the edge of the illuminated region 150 and inside the region 154*a*** until the beginning of the trace portion of the major horizontal deflection sawtooth signal following the termination of the pulse *t3* in FIG. 4.

This action or registration of the scanning beam with respect to the illuminated area 150 takes place before each major horizontal deflection of the scanning beam in the black and white camera head. Because the black and white and color camera heads 20 and 26 are coupled together through the common coupling of the major horizontal deflection coils, registration of the scanning beam with respect to the illuminated reference stripe 150 in the black and white camera head causes proper registration of the beam at the beginning of each line scan in the color camera head once correct initial registration of the two heads has been made. The latter may be effected by means of a small component of differential positioning current provided (not shown) in a conventional manner from the horizontal major deflection unit 108.

Just before the end of each major horizontal deflection of the beam in the black and white camera head, a pulse *t1* occurs as shown in FIG. 4. The pulse *t1* is generated by the horizontal control pulse unit 114 of FIG. 3 and is applied to the automatic amplitude control circuit 110. This control circuit also receives a signal component from the preamplifier 122. If the amplitude of the sawtooth signal generated by the horizontal major deflection generator 108 is such as to deflect the beam substantially into the illuminated region 152, the signal component from the preamplifier 122 will be substantial and a substantial output signal will be generated by the automatic amplitude control circuit 110. This output signal is chosen to be of polarity to reduce the amplitude of the sawtooth signal generated by the horizontal major deflection generator 108, which amplitude is initially set so that the beam ends its line scan within the illuminated region 152. The signal from the preamplifier goes to zero or near zero when the beam is within the nonilluminated region **154*b*. The sawtooth generator 108 is controlled in conventional fashion to reduce the amplitude of the sawtooth output signal. Typically, control is achieved after a number of cycles of line scans so that the sawtooth generator 108 slowly reduces the amplitude of the sawtooth signal C until the scanning beam just reaches the edge of the illuminated region 152 from the non illuminated region 154*b*** after each horizontal trace scan.

It will be noted that the horizontal deflection coils of the black and white and color camera heads are both coupled to the horizontal major deflection generator 108, so that registration of the beam through the black and white camera head results in proper registration of the beam in the color camera head. In this fashion horizontal scan amplitude is maintained at a reference distance corresponding to the distance between the indexing or boundary regions 150 and 152, with the starting position of the scan maintained just at the inside edge of the region 150 and with the terminating position of the beam maintained just at the inside edge of the strip 152. It was explained above, in connection with FIG. 2, how the horizontal minor deflection generator 121, by generating a minor deflection signal that counteracts the major deflection signal, causes the beam to dwell in the various color regions of the target in the color pickup cathode-ray tube 26.

As explained above, the two camera heads may involve individual lens systems coupled together so that one lens system (134 in FIG. 3) undergoes a view angle shift in accordance with focus. The change in view angle may produce trapezoidal distortion. In particular, FIG. **6*a* shows the type of trapezoidal distortion that develops when the two cameras are positioned side by side. FIG. 6*a* is a view looking toward both camera heads 20 and 26. The trapezoidal distortion is apparent in the face of the color camera head 26, and this type of distortion is overcome by the circuit shown in FIG. 6**, which is a modification of a part of the circuit of FIG. 3. In particular, the trapezoidal distortion is such that when the camera heads are positioned side by side, the vertical deflection signal should be modified in the color camera head so that vertical deflection is shrunk on the left side of the target (viewed as in FIG. 6*a*) and is expanded on the right side of the target.

Figure 6:
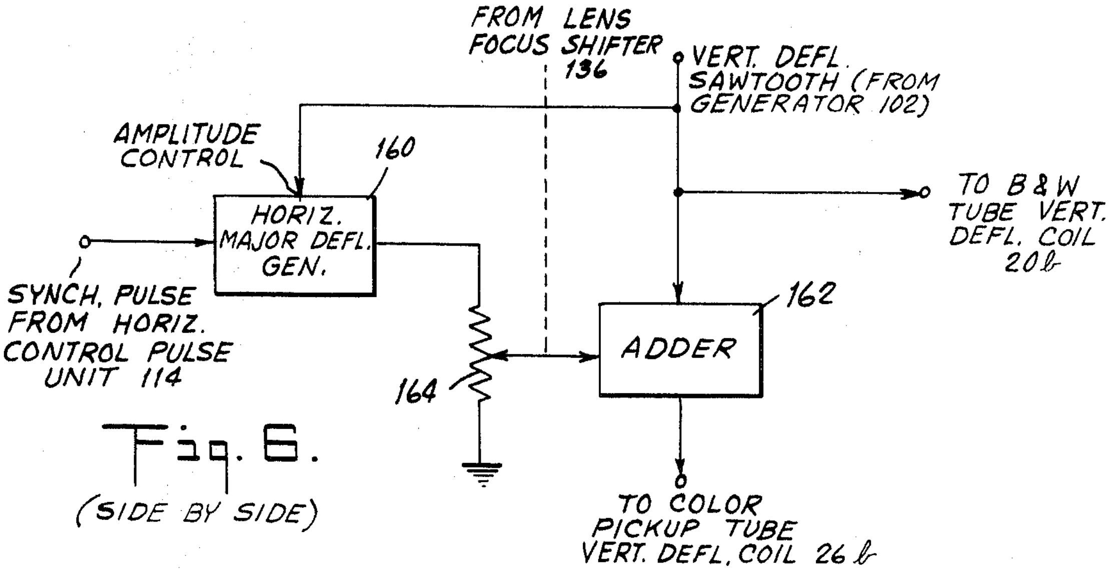
FIGS. 6 and 7 are block diagrams of circuits useful in the system of FIG. 3 for overcoming trapezoidal distortion.
Figures 6A, 7, 7A:
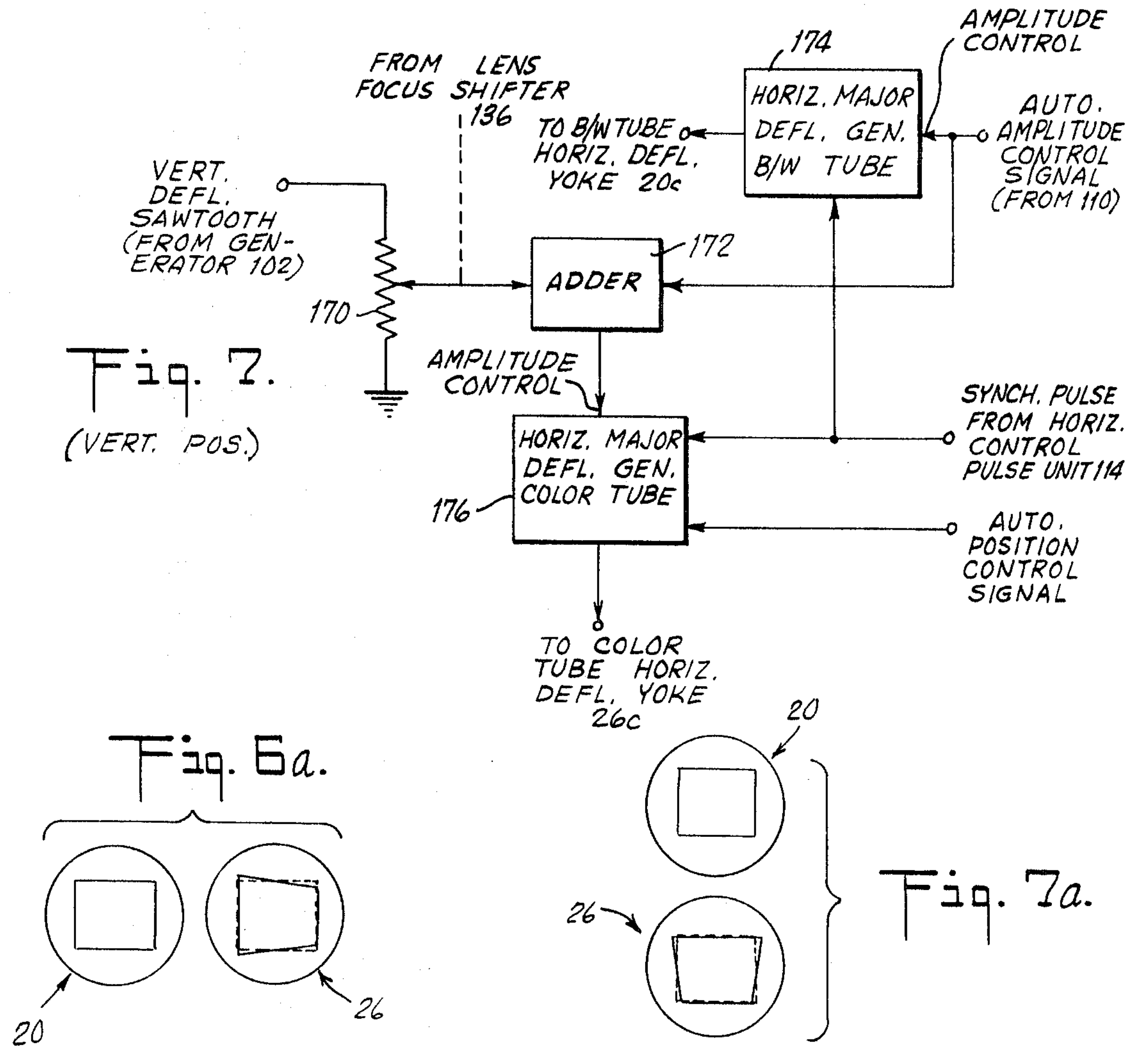
FIGS. 6*a* and 7*a* illustrate trapezoidal distortion as overcome respectively by the circuits of FIGS. 6 and 7.

In FIG. 6 the circuit for accomplishing this change in vertical deflection includes a horizontal major deflection generator 160. This generator is similar to but is not the same as the horizontal major deflection generator 108. Specifically, the deflection generator 160 is a separate generator for generating a sawtooth signal, such as the sawtooth signal C in FIG. 4. However, it is amplitude modulated by the vertical sawtooth to provide a positive or negative horizontal output proportional to the magnitude (+ or −) of the vertical sawtooth. This generator receives a sync pulse from the horizontal control pulse unit 114 of FIG. 3. The generator 160 also receives an amplitude control signal which is derived from the vertical deflection generator 102 in FIG. 3. The signal from the vertical deflection generator 102 is also applied to an adder 162 as well as directly to the vertical deflection coil 20*b* of the black and white camera head 20. The adder 162 received a signal from a potentiometer 164 which is energized by the signal from the horizontal major deflection generator 160; the moving contact of the potentiometer is coupled to the lens focus shifter 136. In other words, the signal developed by the potentiometer 164 as applied to the adder 162 is dependent upon the view angle shift of the lens 134 of the color camera head. Thus the adder 162 develops a vertical deflection sawtooth signal which is modified by a horizontal major deflection signal component adjusted in accordance with view angle shift. The signal from the adder 162 which is applied to the vertical deflection coil 26*b* of the color present when head thus shrinks the vertical deflection signal in accordance with view angle shift when the beam is in the left-hand portion of the image area as viewed in FIG. 6*a*, and expands the vertical deflection signal when the beam is in the right-hand portion of the image area. Thus trapezoidal distortion is overcome for the side-by-side arrangement of the camera heads.

FIG. 7*a* shows the trapezoidal distortion present when the camera heads are positioned one over another. FIG. 7*a* is a view looking toward the faces of the two cathode-ray tubes and shows the trapezoidal distortion in the color camera head. The horizontal deflection should be shrunk in the upper region of the target area and expanded in the lower region to overcome the distortion. The circuit of FIG. 7 accomplishes this change in horizontal deflection. The circuit employs the vertical deflection sawtooth signal from the generator 102 which is applied to a potentiometer 170. The moving contact of the potentiometer is coupled to the lens focus shifter 136 to develop a signal in accordance with view angle shift which is applied to an adder 172. The adder receives the automatic amplitude control signal from the circuit 110 of FIG. 3, which signal is also applied to a horizontal major deflection generator 174 for the black and white tube only. An output signal is generated by the generator 174 which is applied to the horizontal deflection yoke 20*c* of the black and white camera head. Sync pulses from the horizontal control pulse unit 114 are applied to the deflection generator 174 and also to another horizontal major deflection generator 176. The generator 176 generates a signal which is applied to the major horizontal deflection yoke 26*c* of the color camera head. In other words, horizontal major deflection of the two camera heads is separated in the circuit of FIG. 7. The automatic amplitude control signal which carries out registration of the beam with respect to the right-hand illuminated area 152 of the black and white tube in FIG. 5 is added within the adder 172 to the control signal for overcoming trapezoidal distortion. The composite signal from the adder 172 is applied as an amplitude control signal to the deflection generator 176 to expand the horizontal deflection in the lower area of the color tube target and shrink it in the upper area of the target to overcome trapezoidal distortion as shown in FIG. 7*a*.

Figures 8, 9, 9A:
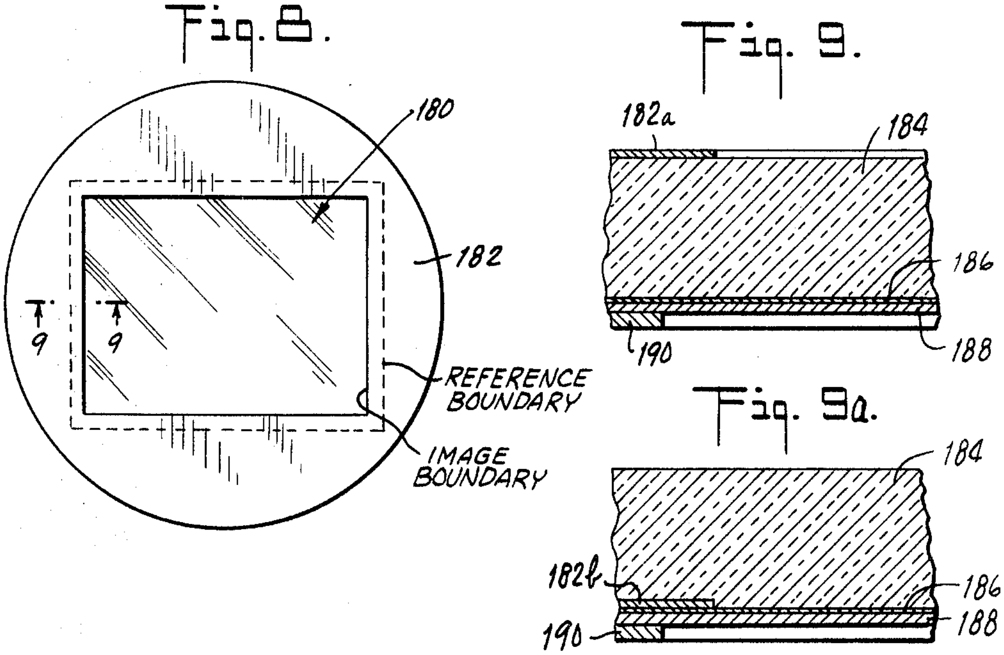
FIG. 8 is a front view of the face of one of the pickup devices of FIG. 3 similar to the view of FIG. 5 show shown in a boundary region.
FIG. 9 is a sectional view of a portion of the structure shown in FIG. 8, taken along the section line 9–9 of FIG. 8.
FIG. 9*a* is a sectional view similar to FIG. 9 showing an alternative form of construction similar to that of FIG. 9.

FIGS. 8 to 10*a* shown various arrangements for p0oviding proper registration of the scanning beam by techniques other than the projection of lines of light carried out by the index line projectors 140 and 142 of FIG. 3. FIG. 8 is a view looking toward the face of the black and white camera head 20, modified by a different indexing arrangement. The image area of the area of the face is designated 180. An opaque mask 182 may be employed, positioned as shown in FIG. 9, on the outer surface of the cathode-ray tube face plate 184 (the mask is designated in FIG. 9 as 182*a*). Alternatively, the opaque mask 182 may be positioned on the inside surface of faceplate 184 directly adjacent the transparent conductive film 186 of the cathode-ray tube (the mask is designated 182*b* in FIG. 9*a*). In either case the cathode-ray tube embodies the typical photosensitive or photoconductive target 188 and includes a conductive reference material 190, which is electrically connected to the conductive film 186. The opaque mask (182*a* or 182*b*) masks the portion of the photoconductive target 188 immediately therebelow. As the scanning beam moves from right to left in FIGS. 9 and 9*a*, it encounters a masked area of the photoconductive target 188 (resulting in no signal from the target) and then encounters the reference conductive material 190 (resulting in a target signal). Thus the beam provides a no-signal-signal operation in the region of the opaque mask 182, which can be uses for the registration of the beam as explained above in connection with FIG. 3.

Figure 10:
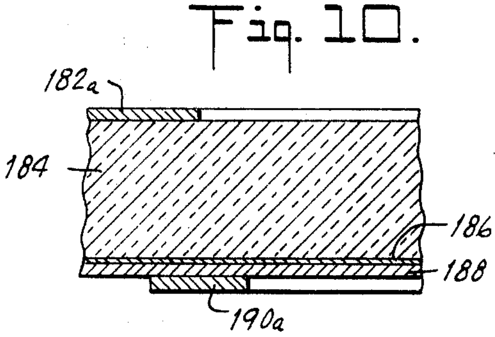
FIGS. 10 and 10*a* are sectional view respectively similar to FIGS. 9 and 9*a* showing further alternative forms of construction to provide scanning beam registration.
Figure 10A:
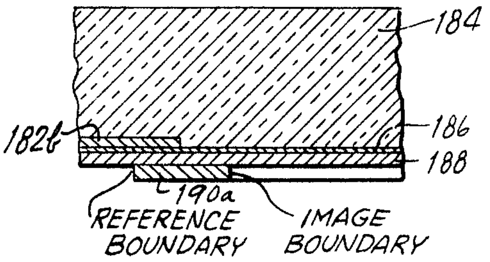

FIGS. 10 and 10*a* shown an alternative construction. Like reference numerals have been employed to designate like parts. Again an opaque mask 182*a* or 182*b* may be employed. A reference conductive material 190*a* is employed which in the case of FIGS. 10 and 10*a* is partly masked by the opaque mask rather than wholly mask. In this case the reference boundary material 190*a* must also be opaque. The reference material 190*a* is electrically connected to the transparent conductive film 186. As the scanning beam moves from right to left in FIGS. 10 and 10*a* and encounters the reference material 190*a*, a signal will be developed at the target 188 until the beam leaves the reference material. When it leaves the reference material, the signal will drop to zero or to very low level because of the masking provided by the mask 182*a* or 182*b*. Hence the beam goes through a signal-no-signal region which may be used for registration purposes when the correct polarity of reference signal shift is provided to the automatic error control circuits described.

Figure 11:
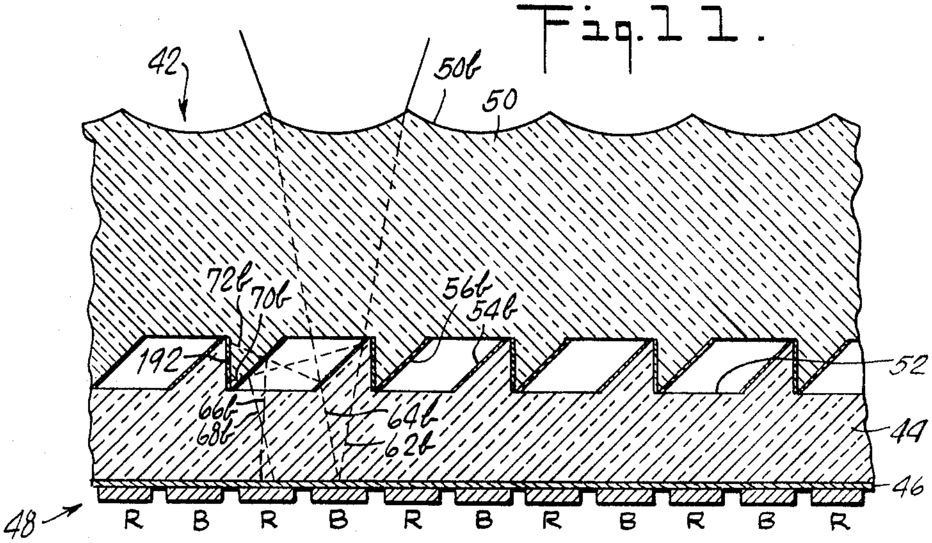
FIG. 11 is a sectional view of a portion of one of the pickup tubes of a color camera illustrating a lens and dichroic element arrangement in accordance with the invention involving an alternative construction to that shown in FIG. 2.

The camera has been described as employing a chrominance channel which generates a signal or signals representative of three primary colors by means for separating them into sets of separately colored stripes. There are a number of variations which may be made of the basic concept. Some of them are shown in FIG. 11. It is well known in color-signal-processing that from a brightness or luminance signal and two primary color signal components the third primary and hence all colors may be derived. The color camera head of the present invention may be set up to provide only two colors. In FIG. 11, having the same basic structural numbering as in FIG. 2 previously described, the surfaces 52 are constructed to provide placement of two dichroic mirror surfaces. In this example the first 54*b* transmits blue to the target surface 48B as shown by peripheral rays 62*b* and 64*b*. Longer wavelengths are reflected to dichroic 56*b*. The green rays 70*b* and 72*b* are transmitted through this dichroic and are absorbed by material 192 at the interface of parts 44 and 50. The red rays 66*b* and 68*b* are reflected from dichroic 56*b* onto target surface 48R. There are no additional mirror surfaces required. With such an arrangement only red and blue switching voltages are necessary to recover the corresponding signal components. In typical applications, the luminance or brightness signal is fed through an approximate 1.5-megacycle low-pass filter and added algebraically to proper portions of the red and blue component signals to obtain a green component signal (see *Principles of Color Television*, by the staff of Hazeltine Corp. edited by McIlwain and Dean, published by John Wiley & Sons, Inc.).

FIG. 11 provides for separate target surface stripes for each color component, for example 48R and 48B. In this arrangement different target materials may be selected, each of which is most sensitive to the wavelength (color) for which it is used.

FIG. 11 also shows use of concave rather than convex cylindrical mirror surfaces 50*b*. Such a surface arrangement allows for a thicker color separation assembly 42 and can accommodate peripheral rays of wider angle as would occur with lower F stop numbers of the main image-forming lens (lens 16 in FIG. 1).

I claim:

1. A color camera comprising a first cathode-ray tube for developing a signal representative of the brightness content of an image, a single second cathode-ray tube for generating a signal representative of chrominance components of the image, the second cathode-ray tube including a photosensitive target, and optical means including a plurality of groups of dichroic and mirror elements, each group separating selected colors from an associated portion of the image and directing each such separated color to an individual area of the target of said single tube associated with the group so that together the groups of elements direct each selected color to a plurality of areas in the target of said single cathode-ray tube.

2. A color camera as defined in claim 1, wherein the optical means includes a plurality of lens elements, each lens element directing a portion of the image to an associated group of dichroic and mirror elements.

3. A color camera as defined in claim 1, including beam-deflecting means for causing the beam to dwell in each individual area for a predetermined time and then to move relatively rapidly with respect to said predetermined time from one area to another area in a predetermined sequence to scan said target.

4. A color camera comprising a first cathode-ray tube for developing a signal representative of the brightness content of an image, a second cathode-ray tube for generating a signal representative of chrominance components of the image, the second cathode-ray tube including a photosensitive target, optical means for spatially separating selected colors of the image onto areas of the target, beam-deflecting means for causing the beam in the second cathode-ray tube to move across said target from area to area, said beam-deflecting means including means for causing the beam to dwell in each area for a predetermined time and then to move relatively rapidly with respect to said predetermined time from one area to an adjacent area, at least one cathode-ray tube having means defining at least one preselected reference boundary on its target surface, and means for registering the movement of the scanning beam within said one cathode-ray tube with respect to said boundary.

5. A color camera as defined in claim 4, wherein the means defining at least one boundary comprises means for providing adjacent bands of illumination and nonillumination to provide a boundary line reference signal.

6. A color camera as defined in claim 4, wherein the means defining at least one reference boundary comprises an opaque region along an edge of the preselected area of said cathode-ray tube target surface preventing light from impinging on the portion of the target therebeneath, said target comprising a first transparent conductive film at least over the complete camera image area, and a second photoconductive film deposited on and behind the first film, and a reference conductive film electrically connected to and positioned behind the target at least partially beneath the opaque region and not extending over the entire target area.

7. A color camera as defined in claim 6, wherein the reference conductive film has an edge constituting said reference boundary, said edge being positioned beneath and interior to the opaque region.

8. A color camera as defined in claim 6, wherein the reference conductive film comprises a strip of conductive material having a first edge underneath a reference edge of the opaque region and a second edge not underneath the opaque region.

9. A color camera as defined in claim 1, including first and second beam-deflecting means associated respectively with the first and second cathode-ray tubes for causing the electron beams therein to scan simultaneously across corresponding target areas therein in a preselected scanning sequence.

10. A color camera as defined in claim 9, including means providing one or more boundary regions of a preselected target area of one of the cathode-ray tubes, and means for registering the movement of the scanning beam in both tubes with respect to the movement of the beam in said one tube with respect to said boundary regions.

11. A color camera as defined in claim 1, including a lens system associated with each cathode-ray tube for focusing an image of a scene on the target of the associated cathode-ray tube, and means coupling together the lens systems to provide a relative view angle shift of the lens system dependent upon a simultaneous focus shift of both lens systems.

12. A color camera as defined in claim 11, including means for electrically correcting for any distortions introduced by said view angle shift.

13. A color camera as defined in claim 12, wherein said connecting means comprises deflection means for expanding and shrinking the distances through which the scanning beam moves in various areas of the target in order to compensate for trapezoidal distortion.

14. A color camera head comprising a single cathode-ray tube that includes a target which is scanned by the electron beam of the tube, and a plurality of groups of dichroic and mirror elements, each group separating selected colors from an associated portion of an image and directing each separated color to an individual area of the target of said single tube associated with the group so that together the groups of elements direct each selected color to a plurality of areas in the target of said single cathode-ray tube.

15. A color camera as defined in claim 14, including a plurality of lens elements each directing a portion of said image to an associated group of dichroic and mirror elements.

16. A color camera as defined in claim 14, including beam-deflecting means for causing said beam to move in a predetermined sequence across said target from individual area to area.

17. A color camera as defined in claim 16, wherein said beam-deflecting means includes means for causing the beam to dwell in each individual area for a predetermined time and then to move relatively rapidly with respect to said predetermined time from one area to another area.

18. A color camera as defined in claim 16, including means for registering the movement of the beam in said individual areas with respect to one or more reference boundary lines.

19. A color camera as defined in claim 1, wherein each group of dichroic and mirror elements separates the primary colors red, green and blue from the associated portion of the image.

20. A color camera as defined in claim 1, wherein each group of dichroic and mirror elements separates two of the three primary colors from the associated portion of the image.

21. A color camera as defined in claim 20, wherein each group of dichroic and mirror elements comprises a pair of dichroic mirror elements which separate the two primary colors red and blue from the associated portion of the image.

22. A color camera as defined in claim 14, wherein the target comprises photosensitive signal-generating strips, preselected to correspond to said separated colors.

23. A color camera as defined in claim 22, wherein the target comprises strips of photoconductive material.

24. A color camera as defined in claim 1, wherein the target comprises strips of photoconductive material, each strip chosen for high sensitivity to and receiving light of a separated primary color from an associated group of dichroic and mirror elements.

25. A color camera head comprising a cathode-ray tube that includes a photosensitive target which is scanned by the electron beam of the tube, means for separating predetermined component colors of an optical image associated with the target into individual areas of the target, and beam deflection means for causing the beam to dwell for a predetermined time in each area of said target and to move rapidly compared with said time from one area to another area.

26. A color camera head as defined in claim 25, including means defining at least one reference boundary line preselected to have a predetermined relation to the target positions of said component colors, and means including said deflection means for registering the movement of the scanning beam with respect to said reference line.

27. A color camera comprising a first cathode-ray tube for developing a video signal representative of luminance content of an image, and a second cathode-ray tube for generating a predetermined constant frequency chrominance signal, wherein the second cathode-ray tube includes a photosensitive target, and optical means for separating the image into representative sets of vertically oriented primary color stripes across said target, means including reference boundary lines located at each side of the target area and having predetermined positional relationship to said color stripes, and including first and second deflection means associated respectively with the first and second cathode-ray tubes for causing the respective electron beams to scan simultaneously target areas therein corresponding to the same image area, wherein the first deflection means provides a horizontal line scan at substantially uniform rate and the second deflection means provides a constant frequency horizontal stepwise scanning and dwell on each color stripe at a rate to scan each set of color stripes at the constant frequency of said chrominance signal.